(12) United States Patent
So

(10) Patent No.: US 7,778,512 B2
(45) Date of Patent: Aug. 17, 2010

(54) LIGHT-PIPE ARRAY SYSTEM

(75) Inventor: Daniel W. So, Palo Alto, CA (US)

(73) Assignee: Scenterra, Inc., Bowie, MD (US)

( * ) Notice: Subject to any disclaimer, the term of this patent is extended or adjusted under 35 U.S.C. 154(b) by 0 days.

(21) Appl. No.: 11/897,099

(22) Filed: Aug. 28, 2007

(65) Prior Publication Data

US 2009/0059356 A1 Mar. 5, 2009

(51) Int. Cl.
G02B 6/04 (2006.01)
C12Q 1/68 (2006.01)

(52) U.S. Cl. .......................... 385/115; 435/6

(58) Field of Classification Search ......... 385/115–120, 385/147; 204/157.3; 422/186.3; 435/6; 352/198, 203, 205, 244; 362/551, 554, 556, 362/538
See application file for complete search history.

(56) References Cited

U.S. PATENT DOCUMENTS

| | | | |
|---|---|---|---|
| 5,700,637 A | 12/1997 | Southern | |
| 5,744,305 A | 4/1998 | Fodor et al. | |
| 5,753,788 A | 5/1998 | Fodor et al. | |
| 5,768,009 A | 6/1998 | Little | |
| 5,831,070 A | 11/1998 | Pease et al. | |
| 5,929,208 A | 7/1999 | Heller et al. | |
| 6,054,270 A | 4/2000 | Southern | |
| 6,271,957 B1 | 8/2001 | Quate et al. | |
| 6,375,903 B1 | 4/2002 | Cerrina et al. | |
| 6,589,489 B2 * | 7/2003 | Morrow et al. ........... 422/186.3 |
| 6,649,402 B2 | 11/2003 | Van der Weide et al. | |
| 7,037,659 B2 | 5/2006 | Cerrina et al. | |
| 7,072,500 B2 | 7/2006 | Cerrina et al. | |
| 7,081,954 B2 | 7/2006 | Sandstrom | |
| 7,250,289 B2 | 7/2007 | Zhou | |
| 7,256,466 B2 * | 8/2007 | Lieber et al. ................. 257/414 |
| 2003/0157538 A1 | 8/2003 | Krull et al. | |
| 2004/0018523 A1 * | 1/2004 | Hawkins ........................ 435/6 |
| 2007/0081242 A1 * | 4/2007 | Kempa et al. ............... 359/486 |

(Continued)

OTHER PUBLICATIONS

McGall, et al., "Light-Directed Synthesis of High-Density Oligonucleotide Arrays Using Semiconductor Photoresists," Proc. Natl. Acad. Sci. USA, vol. 93, pp. 13555-13560, Nov. 1996.

(Continued)

*Primary Examiner*—Brian M. Healy
*Assistant Examiner*—Guy G Anderson
(74) *Attorney, Agent, or Firm*—Matthew J. Esserman

(57) ABSTRACT

A light-pipe array system is provided. The system comprises a light projector that projects light, and a light-pipe array. The light-pipe array comprises a plurality of light-pipes. Each light-pipe comprises a dielectric transparent to the light, and an electrically conductive light barrier layer surrounding the dielectric. The barrier layer guides the light from an entrance of the dielectric surrounded by the barrier layer to an exit of the dielectric surrounded by the barrier layer. Each light pipe also comprises a light-receiving element that increases throughput of the guided light transmitted within the barrier layer via the dielectric. In one embodiment, the light-receiving element comprises an electrical conductor positioned along a central longitudinal axis of the dielectric. In another embodiment, the light-receiving element alternatively comprises a focusing element. The guided light transmitted within the barrier layer via the dielectric is used in fabricating photosynthesized bio-materials such as, for example, oligonucleotides.

17 Claims, 4 Drawing Sheets

U.S. PATENT DOCUMENTS

2008/0093210 A1* 4/2008 Edwards .................. 204/157.3

OTHER PUBLICATIONS

Harbert, "The evolution of the biochip" Website: ArticlePrint on EDN: Electronics Design, Strategy, News (http://www.edn.com/index.asp?layout=articlePrint&articleID=CA528406), 1-8 (May 2005).

Pease, et al., "Light-generated oligonucleotide arrays for rapid DNA sequence analysis" Proc. Natl. Acad. Sci. USA. May 1994, vol. 91, pp. 5022-5026.

Singh-Gasson, S., et al., "Maskless fabrication of light-directed oligonucleotide microarrays using a digital micromirror array" Nature Biotechnology 17:974-978 (Oct. 1999).

Gao, X., et al., "A flexible light-directed DNA chip synthesis gated by deprotection using solution photogenerated acids" Nucleic Acids Res. 29(22), 4744-4750 (2001).

Moorcroft, M. J., et. al., "In situ oligonucleotide synthesis on poly(dimethylsiloxane): a flexible substrate for microarray fabrication" Nucleic Acids Res. 33(8), e75, 1-10 (2005).

Blair, S., et al., "A scalable method for multiplex LED-controlled synthesis of DNA in capillaries" Nucleic Acids Res. 34(16), e110, 1-8 (2006).

Kothapalli, R., et al., "Microarray results: how accurate are they?" BMC Bioinformatics 3:22, 1-10 (2002).

Rybczynski, J., et al., "Subwavelength waveguide for visible light" Applied Physics Letters 90, 021104, 3 pages (2007).

Moore, S, "Making Chips" IEEE Spectrum, 54-60, Mar. 2001.

NimbleGen online brochure: "Comparative Genome Sequencing Microarrays and Services" from website (http://www.nimblegen.com/products/lit/nimblegen_cgs_datasheet.pdf) 4 pages, 2007.

Goldman, et al "Microarrays—A Whole New Ballgame" Lehman Brothers, Nov. 19, 43 pages 2003.

Moeller, et al, "Chip-based electrical detection DNA" IEE Proc.-Nanobiotechnol., 152(1), 47-51 (Feb. 2005).

Li, J., et al., "Inlaid Multi-Walled Carbon Nanotube Nanoelectrode Arrays for Electroanalysis", *Electroanalysis*, 2005, 17(1), 15-27.

Vieira, Sara M.C., et al., "Investigation of field emission properties of carbon nanotube arrays defined using nanoimprint lithography" Appl. Phys. Lett. 89, 022111, 3 pages (2006).

Yoder, "An Introduction to the Digital Light Processing (DLP) Technology" Texas Instruments, taken from (http://focus.ti.com/download/dlpdmd/119_Intro_Digital_Light_Processing.pdf), 7 pages, 1997.

* cited by examiner

LIGHT-PIPE ARRAY SYSTEM

FIELD OF THE INVENTION

The present invention relates generally to the field of array systems, and, more specifically, to array biochip systems comprising light-pipe arrays.

BACKGROUND OF THE INVENTION

A microarray starts with a piece of glass, or sometimes a silicon chip, the size of a microscope slide or smaller. Onto this substrate are fixed thousands of patches of single-stranded deoxyribonucleic acid (DNA), called probes, each patch measuring just tens of micrometers across. The location and sequence of each patch of DNA are known ahead of time. Genes are segments of DNA that contribute to phenotype/function. The function of genes is encoded in the sequence of chemicals that make up DNA. These chemicals, called nucleotides, each contain a sugar and phosphate backbone plus one of four molecules called bases-adenine (A), thymine (T), cytosine (C), or guanine (G). In the DNA molecule, the nucleotides are chemically bonded to and stacked atop each other in two strands forming a twisted ladder. The rungs of the ladder are the bases, with adenine always across from thymine and guanine always across from cytosine; however, under certain conditions the DNA helix can detach along the rungs of the ladder to form two single strands.

Microarrays draw on the so-called hybridization reaction. Two lengths of single-stranded DNA will bind together, or hybridize, only if the bases on one strand find a complementary sequence of bases on the other strand. In practice, every adenine base must match up with a thymine, and each guanine with a cytosine. A leading use of DNA microarrays is in determining which subset of a cell's genes are expressed, or are actively making proteins, under certain conditions, like exposure to a drug or toxic substance. A toxicology experiment, for example, might compare a normal cell to one that had been exposed to a drug. In a diagnostic experiment, such as in leukemia studies, two types of cancer cells are used.

The experiment works because when a cell is making protein, the DNA that specifies which type of protein to make is first transcribed into ribonucleic acid, or RNA—a chemical that can encode the same information as DNA. In the lab, scientists extract the RNA and then build single-stranded DNA copies of it. To aid in detecting the DNA on the microarray, they bind fluorescent molecules, or tags, into the new DNA. When the tagged single-stranded DNA is washed over the array, it sticks fast only to any single-stranded probe DNA that has a complementary gene-sequence to its own. Those with no complementary site on the array will wash off. A scan of the array with a laser or other excitation source causes any DNA that has found a tagged match to fluoresce, and that glow is picked up by a photodetector. The photodetector may consist, for example, of a charge-coupled device or a photomultiplier tube.

The fluorescent image of the microarray from the photodetector is then transmitted to a computer, which analyzes the location, color, and brightness of each patch of DNA on the microarray. Because the sequence of the array's DNA in each spot is known, the sequence of any DNA captured on that spot is also known. Comparing the colors found at those points on the array reveals the difference in gene expression between the two cells. Genetic variations called single nucleotide polymorphisms (SNPs) can also be uncovered by microarrays. SNPs are variations or mutations at a single spot in a gene's sequence. Since single-stranded DNA prefers to hybridize only with its perfect complement, arrays can determine the presence of such a mutation. SNPs are thought to be the key to understanding why people vary in their susceptibility to diseases.

Experimental arrays containing partial genomes of organisms such as yeast and humans are the bread-and-butter of most biotech firms, but many companies also custom-build arrays from gene sequences that customers upload to them. However, these processes are extremely expensive and time-consuming.

There are a number of ways that are conventionally known to make arrays. Affymetrix Inc., Santa Clara, Calif. makes high-density arrays with a method familiar to anyone in the semiconductor industry, namely, photolithography. This technology, known in the microarray industry as light-directed in situ synthesis, builds DNA probes one base/nucleotide at a time right on the chip (known also as a gene chip, or biochip). Construction begins with a glass slide that has been chemically primed with sites ready to bind nucleotides. The sites are capped by a photosensitive chemical that detaches under illumination. Light is shone through a patterned mask onto the chip, causing the capping chemical to break away from the areas it illuminates, thus exposing the primed spots. A solution containing one of the four types of nucleotides (each molecule of which is itself attached to a capping molecule) is then washed over the chip. The nucleotides bond only to the areas that have been exposed, and add a capping layer themselves. As the process can be repeated with another mask and a different nucleotide, a variety of DNA sequences can be built on the chip. Photolithography offers the highest density of probes per unit area of any technique currently in use. Production-scale chips can pack 400,000 probes in 20-μm patches. The single-stranded DNA reaches only 25 nucleotides in length, so that it takes several such patches to positively identify a single gene. One weakness to the current photolithography method is that a new set of masks must be produced for every new type of array. To overcome this problem, scientists at the University of Wisconsin in Madison, the University of Texas Southwestern Medical Center in Dallas, and Xeotron Corp. in Houston have demonstrated a maskless technique that uses an array of micromirrors that reflect onto the appropriate spots on the chip.

Perhaps the most straightforward array-making method is contact printing. A pin is first dipped into a solution containing pieces of DNA of uniform sequence that have been synthesized in the lab. The pin is pressed to the array surface, leaving behind a droplet of solution. Researchers and companies have developed several variations on this basic technique. The most obvious is the replicator pin, whose point must be rewetted after each deposition. Alternatively, pins with a split tip or a hollow tip hold a reservoir of fluid. In a third method, utilized by an acquired division of Affymetrix, a pin passes through a ring near its tip before contacting the array surface. The ring, once dipped into a solution of DNA, acts as a reservoir for the pin.

Corning Inc., of Corning, N.Y. chose the simple replicator pin design but executed it in a different manner. It prints a thousand spots of DNA simultaneously onto a glass microarray, far more than any other contact printing method. To break into high-density microarrays, Corning developed a printing system using a technique intended for printing color filters onto LCDs and applied it to building an array of DNA-printing pins. That technology involved a type of photosensitive glass into which features on the order of 100 μm can be etched. A pattern is projected onto the glass, which is then doused with hydrofluoric acid. The process yields a print head with 1000 pins about 100 μm in diameter, each separated by 100-120 µm. Figuring out how to wet each pin with a unique DNA sample was another challenge. The process utilizes a funnel-shaped reservoir of 1000 tightly packed conical cells. To make an array, a high-precision robotic system dips the pin head into the tip of the reservoir and then places it onto a glass slide. Corning currently uses a series of ten 1000-pin heads and reservoirs to produce arrays with 10,000 features each.

Inkjetting (Agilent Technologies Inc., headquartered in Santa Clara, Calif.) has two capabilities: it can print spots of DNA sequences synthesized in the lab and also, in a process called in situ fabrication, it can build up parts of genes on the array one base/nucleotide at a time. The inkjet technology is essentially the same as that found in a desktop printer. Jets of fluid are pressed through nozzles and broken into uniform droplets by the print head. For in situ synthesis, the four colors of ink—cyan, magenta, yellow, and black—are replaced with nucleotides of DNA having the four types of bases—adenine, guanine, cytosine, and thymine. The first set of nucleotides are ejected from the nozzle onto the substrate, then chemically fixed to the surface. The next set of nucleotides are jetted onto the first and chemically fixed to those. The process is repeated until the desired set of DNA is complete. This system can build lengths of DNA up to 60 nucleotides long. Of particular help is that different in situ arrays can be synthesized without a change in hardware or chemicals. In contrast, photolithographic methods require a set of masks for each new pattern.

The 60-base length is much shorter than an entire gene, which often runs to hundreds or thousands of bases. But using algorithms, Agilent claims that it can take a gene sequence and find a single 60-base sequence within the gene that will effectively identify it for genomics applications. In contrast to the in situ method, depositing pre-synthesized DNA uses about 100 jet nozzles, each spitting out a unique sequence of DNA. For both methods, the spot size ends up being 70-120 µm in diameter, allowing for arrays with about 25,000 features.

Electric fields have been found useful in microarrays. Motorola Inc. (Schaumburg, Ill.) is working on a method of detecting hybridized DNA using electrical signals rather than optical ones. The technology is incompatible with the glass arrays the company is developing because it requires addressable electrodes and other embedded circuitry. So Motorola has begun designing a silicon-based technology to take advantage of its semiconductor manufacturing experience. It plans to combine that experience with technology from the acquired Clinical Micro Sensors, Pasadena, Calif. which has developed a process that detects hybridization through a change in conductance.

Nanogen Inc. (San Diego, Calif.) is hoping the improved hybridization speed of its chip will give it a leg up in the medical diagnostics market. Companies envision microarrays that can detect the presence of genetic variations that make one drug therapy more efficacious than another. Some chips are already being tested in clinical laboratories, but estimates of when microarray-aided diagnostics will take off vary. For them to become an important market, the technology will have to improve. In particular, sample preparation time and complexity will have to decrease, so firms expect their current arrays to evolve into more complete on-chip laboratories capable of performing all the necessary procedures to extract genetic material from tissue or blood samples and then analyze it as well. The research market is shifting as well. As more and more DNA sequences are completed, biologists are looking downstream of DNA for clues to how the body works. And so their attention is turning to understanding proteins and their interactions. Some companies such as Ciphergen Biosystems Inc., of Fremont, Calif. are building their business around arrays of chemicals such as antibodies that will bind and identify proteins much as the DNA devices do. Several firms, including Agilent and Corning, believe their basic microarray platform will be compatible with producing such arrays. And one firm, Packard Instrument Co., of Meriden, Conn. has given up its DNA array business in favor of protein chips. Both protein chips and DNA arrays may benefit of the present invention described in detail below.

The above attempts at fabrication and utilizing microarrays have been found to suffer from various drawbacks. For example, the conventional high density microarrays (see Affymetrix Inc and Corning Inc. mentioned above) are limited by their current manufacturing processes. By shrinking the array's features, more functional chips may be made out of, for example, a single glass wafer. Making fewer wafers cuts down on the expensive chemicals needed to make the microarrays, and making smaller arrays reduces the amount of reagents needed to perform experiments with them. Still, scientists want more densely packed arrays. Ideally, they'd like to fit all of a human or other organism's genes onto a single microarray, so they can be studied all at once, rather than piecemeal. Recent estimates of the number of genes in a human genome may bring the goal posts a little closer. Scientists now say we have only 30 000-40 000 genes. Other drawbacks that exist with conventional microarrays, as mentioned above, include extremely high equipment and processing costs, lengthy microarray and gene probe fabrication times, inability to perform real-time gene probe programmability (customization), time-consuming and labor intensive gene detection protocols, high false-positive error rates due, for example, to poor probe quality, short resultant probe lengths, and bulkiness/non-portability of equipment.

It is therefore desirable to provide an array biochip system having ultra high-density capabilities that may optionally be employed in, for example, non-optical detection schemes, and that does not suffer from the above drawbacks.

These and other advantages of the present invention will become more fully apparent from the detailed description of the invention hereinbelow.

SUMMARY OF THE INVENTION

The present invention is directed to a light-pipe array system. The system comprises a light projector that projects light, and a light-pipe array. The light-pipe array comprises a plurality of light-pipes. Each light-pipe comprises a dielectric transparent to the light, and an electrically conductive light barrier layer surrounding the dielectric. The barrier layer guides the light from an entrance of the dielectric surrounded by the barrier layer to an exit of the dielectric surrounded by the barrier layer. Each light-pipe also comprises a light-receiving element that increases throughput of the guided light transmitted within the barrier layer via the dielectric. The light preferably comprises UV light. The guided light transmitted within the barrier layer via the dielectric may be used in fabricating sequences of nucleotides at or in the vicinity of the exit of the dielectric.

The light-receiving element may comprise an electrical conductor positioned along a central longitudinal axis of the dielectric, wherein the conductor includes a first end and a second end, wherein the first end extends beyond the entrance of the dielectric surrounded by the barrier layer to a location that is not surrounded by the barrier layer, and wherein the second end terminates substantially at the exit of the dielectric surrounded by the barrier layer. Alternatively, the light-receiving element may comprise a focusing element positioned beyond the entrance of the dielectric surrounded by the barrier layer at a location that is not surrounded by the barrier layer.

In any of the above embodiments, each light-pipe may also comprise a substrate transparent to the light, wherein the dielectric is positioned on the substrate. Each light-pipe may further comprise an electrical conductor transparent to the light, wherein the electrical conductor is positioned between the dielectric and the substrate. Each light-pipe may also further comprise an electrical insulator positioned on the barrier layer, and an electrically sensing electrode positioned on a side of the barrier layer opposite the dielectric such that the insulator is position between the barrier layer and the sensing electrode. The electrical conductor, the barrier layer, and the sensing electrode are preferably electrically connected to an electrical circuit which detects variations in electrical properties during and/or subsequent oligonucleotide hybridization.

BRIEF DESCRIPTION OF THE DRAWINGS

For the present invention to be clearly understood and readily practiced, the present invention will be described in conjunction with the following figures, wherein.

DETAILED DESCRIPTION OF THE PREFERRED EMBODIMENTS

Figure 1:
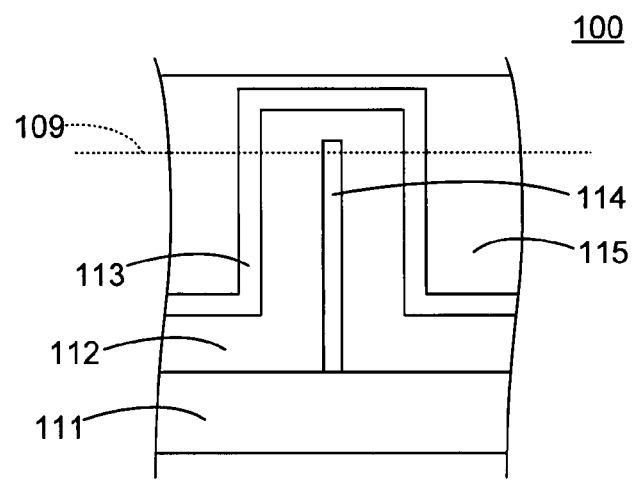
FIG. 1 is a cross-sectional side view of a portion of a step in a method of making a light-pipe array that includes a UV light-receiving element (e.g. in the form of an electrical conductor) formed interiorly within a UV-transparent dielectric, in accordance with a preferred embodiment of the present invention.

It is to be understood that the figures and descriptions of the present invention may have been simplified to illustrate elements that are relevant for a clear understanding of the present invention, while eliminating, for purposes of clarity, other elements found in a typical array biochip system. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

For purposes of this disclosure, the term "array" is hereby defined to include microarray, "gene-chip", and "biochip".

FIG. 1 is a cross-sectional side view of a portion of a step in a preferred exemplary method of making a light-pipe array 100 that includes a UV light-receiving element (e.g. in the form of an electrical conductor 114) formed interiorly within a UV-transparent dielectric 112, in accordance with a preferred embodiment of the present invention. In this preferred exemplary method, a UV-transparent dielectric 112 (such as, for example, silicon dioxide) is preferably formed on a dielectric substrate 111 such as, for example, crystalline quartz or fused silica. The UV-transparent dielectric 112 may be deposited on the substrate 111 by, for example, chemical vapor deposition (CVD), or sputter deposition. An electrically conductive UV barrier layer 113 is similarly subsequently deposited on the UV-transparent dielectric 112. The barrier layer 113 is preferably a metal and may be, for example, gold, chromium, aluminum, copper, silver, platinum, metal composite, or a multilayer of metals. An optional insulator 115 such as, for example, spin-on-glass or silicon dioxide may be formed on the barrier layer 113. The UV barrier layer 113 corresponding to one of the light-pipes within the light-pipe array 100 is integral with or electrically connected to a UV barrier layer 113 corresponding to an adjacent one of the light-pipes within the light-pipe array 100. Alternatively, the UV barrier layer 113 corresponding to one of the light-pipes within the light-pipe array 100 is electrically isolated from a UV barrier layer 113 corresponding to an adjacent one of the light-pipes within the light-pipe array 100.

In this configuration, a UV light-receiving element such as, for example, a conductor 114 preferably in the form of a solid or hollow cylindrical rod is provided. The conductor 114 may comprise any electrically conductive material, for example, metal (e.g. copper), carbon nanotubes, or various conductive nanowires. The conductor may preferably be grown on the substrate 111 (using, for example, a CVD technique) and is formed prior to the deposition of the UV-transparent dielectric 112 in the above process step. The conductor 114 is preferably positioned substantially along a central longitudinal axis of the dielectric, wherein the conductor includes a first end 114a and a second end 114b (see FIG. 2), wherein the first end 114a extends beyond the entrance of the dielectric surrounded by the barrier layer to a location that is not surrounded by the barrier layer, and wherein the second end 114b terminates substantially at the exit of the dielectric surrounded by the barrier layer.

Figure 2:
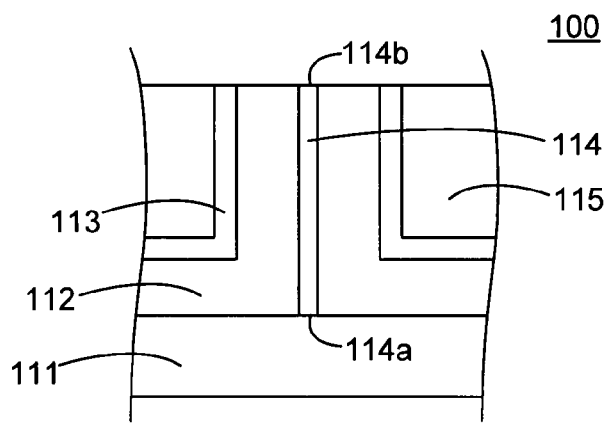
FIG. 2 is a cross-sectional side view of a light-pipe within a light-pipe array that includes a UV light-receiving element (e.g. in the form of an electrical conductor) formed interiorly within a UV-transparent dielectric, in accordance with a preferred embodiment of the present invention.

After formation/deposition of the above layers, a removal process such as, for example, etching (chemically or mechanically) or polishing (chemically or mechanically), is performed (e.g. towards line 109) to remove an upper layer of the spin-on-glass 115, a portion of the barrier layer 113, and a portion of the conductor 114. This removal process forms the exits of the light-pipes and ensures uniform height of the light-pipes within the light-pipe array. FIG. 2 illustrates a portion of the light-pipe array 100 after this removal process.

Figure 8:
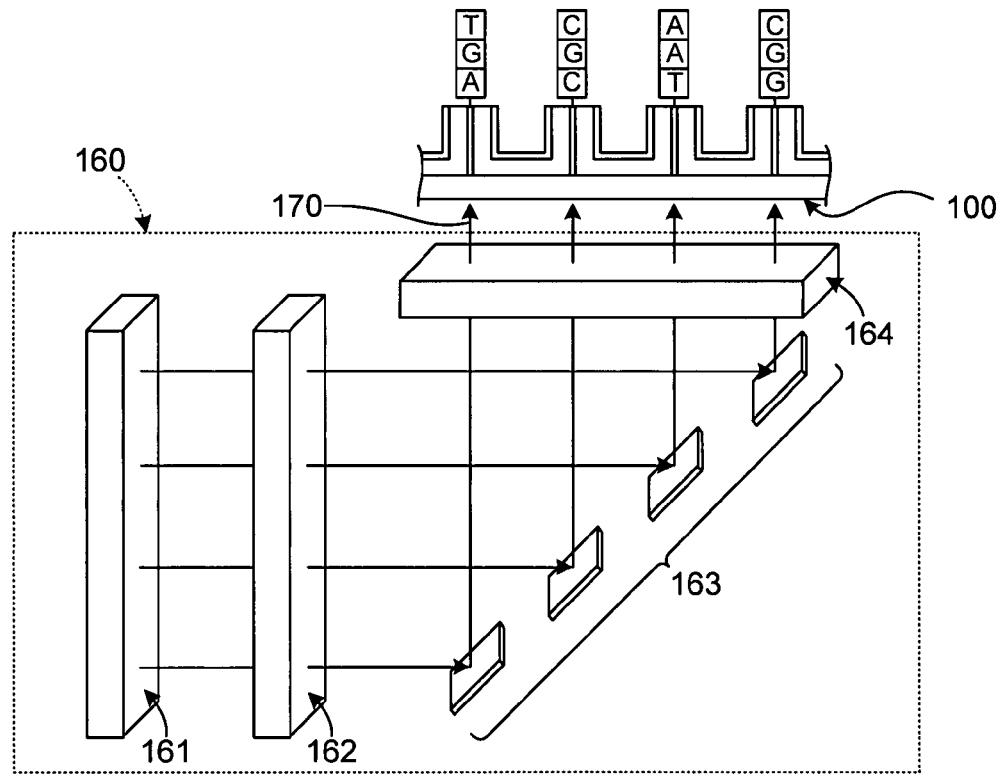
FIG. 8 is a view of the light-pipe array and the formation of the oligonucleotides shown in FIG. 7 employed in conjunction with a UV light projector, in accordance with a preferred embodiment of the present invention.

In the light-pipe array system, the light-pipe array 100 is employed in conjunction with a UV light source preferably provided by a UV light projector 160 (FIG. 8). The UV light projector 160 projects UV light 170 towards predetermined light-pipes within the light-pipe array 100 preferably using a light modulator 163 such as, for example, a digital micromirror device (DMD). Each mirror within the DMD is selectively addressable and essentially functions as an on/off switch for each light-pipe and is preferably aligned with a corresponding pixel, wherein each pixel may comprise one or more light-pipes. Each light-pipe array may comprise any number of pixels.

The UV light projector 160 includes a UV light source 161 such as, for example, UV light emitting diodes (LEDs) or a mercury arc lamp. UV LEDs are preferable since they operate with low voltage, are highly efficient, light-weight, compact, inexpensive, long-lasting, eco-friendly, functional at high-power, and the spectrum has a very narrow bandwidth in the desired wavelength. The UV light projector 160 may preferably have projection optics 162 prior to the light modulator 163 and imaging optics 164 subsequent to the light modulator. The projection optics 162 preferably homogenizes and collimates the light distribution. When using a DMD, the imaging optics 164 preferably matches/focuses each mirror within the DMD to each pixel. Alternatively, the imaging optics 164 may be configured to match/focus each mirror within the DMD to a plurality of pixels when employing projection techniques such as, for example, wobulation or step-and-repeat.

During operation, the coaxial-type light-pipe structure which comprises the UV barrier layer 113 surrounding the dielectric 112, the dielectric 112 surrounded by the barrier layer, and the conductor 114 guide the projected UV light 170 from an entrance of the dielectric surrounded by the barrier layer to an exit of the dielectric surrounded by the barrier layer. The UV light-receiving element (i.e. the extended/protruded portion of the conductor 114) increases UV throughput of the guided UV light transmitted within the barrier layer via the dielectric. In other words, the presence of the conductor 114 (which extends slightly below the barrier layer 113 as illustrated in FIG. 2—the amount of this extension may vary and may result in the conductor extending to within the substrate) enlarges the volume of projected modulated UV light entering the corresponding light-pipe within the light-pipe array. In this configuration the conductor 114 functions similarly to an antenna in that the UV light throughput entering the corresponding light-pipe is increased. With this enhanced and highly focused UV light throughput and light-pipe array configuration, the light-pipes within the light-pipe array may easily be positioned more closely to one another, thereby resulting in a much more densely packed array than previous conventional array devices. This configuration includes significant advantages such as, for example, low equipment and processing costs, short gene probe fabrication times, ability to perform real-time gene probe programmability (customization), non-time-consuming and non-labor intensive gene detection protocols, little or no false-positive error rates due, for example, to poor probe quality, long resultant probe lengths, and portability of equipment.

Figure 6:
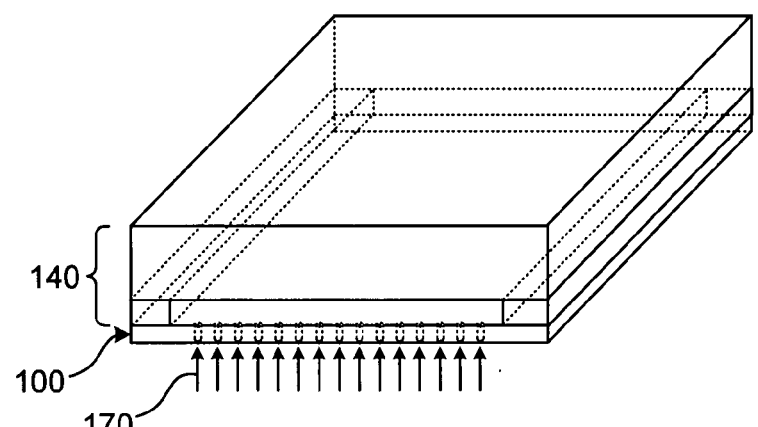
FIG. 6 is an elevated perspective view of a light-pipe array employed in conjunction with a reaction chamber, in accordance with a preferred embodiment of the present invention.
Figure 7:
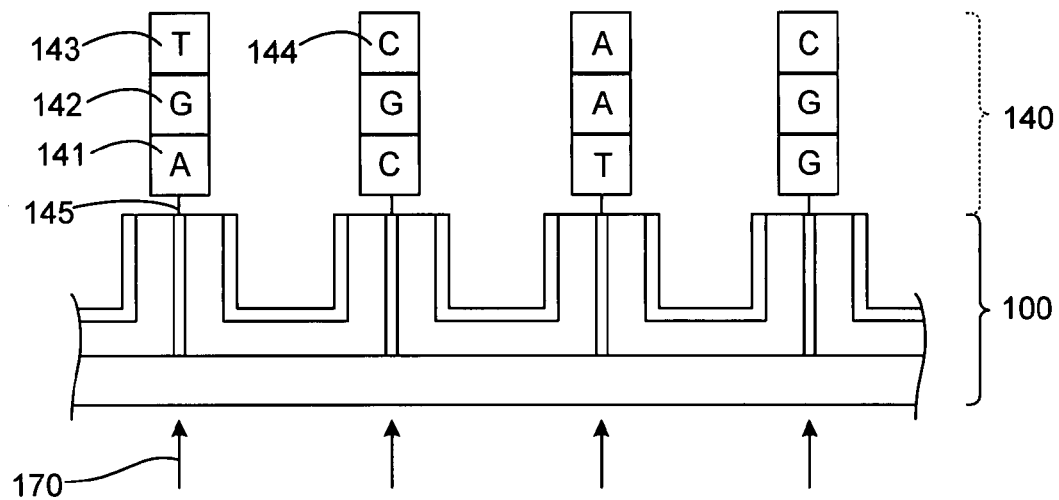
FIG. 7 is a cross-sectional side view of a light-pipe array and the formation of oligonucleotides, in accordance with a preferred embodiment of the present invention.

The exits of the light-pipes within the light-pipe array are positioned within a reaction chamber 140 as illustrated in FIG. 6. FIG. 6 is an elevated perspective view of a light-pipe array 100 employed in conjunction with a reaction chamber 140, in accordance with a preferred embodiment of the present invention. During operation, various solutions (i.e. used in fabricating oligonucleotides comprising sequences (of any number) of nucleotides (Adenine 141, Guanine 142, Thymine 143, or Cytosine 144)-FIG. 7) flow in and out of the reaction chamber 140. In particular, a first oligonucleotide-forming fluid is provided within the reaction chamber. This particular fluid is associated with forming one type of nucleotide when illuminated with UV light 170 originating from the UV light projector 160 towards pixels predetermined by the programmer of the system. The one nucleotide is only formed at pixels turned "ON" by the corresponding mirror within the DMD. Subsequent formation of this selective first oligonucleotide, a washing fluid is provided within the reaction chamber. The oligonucleotides bond only to the areas that have been exposed while the remaining solution washes off. The process is repeated for the next desired/programmed oligonucleotide to be formed using the corresponding oligonucleotide-forming fluid thereof. The use of oligonucleotide-forming fluids to form oligonucleotides is similar to the fluids used in conventional UV light-directed in situ fabrication techniques for microarrays. An optional linker 145 may be provided such that the linker 145 is substantially adjacent to the exits of the light-pipes. When the linker is utilized, the oligonucleotides may be formed on the linker within the reaction chamber. FIG. 7 is a cross-sectional side view of an exemplary light-pipe array 100 and the formation of the above-mentioned oligonucleotides within the reaction chamber 140, while FIG. 8 is a view of the light-pipe array and the formation of the oligonucleotides shown in FIG. 7 employed in conjunction with a UV light projector 160, in accordance with a preferred embodiment of the present invention.

Figure 9:
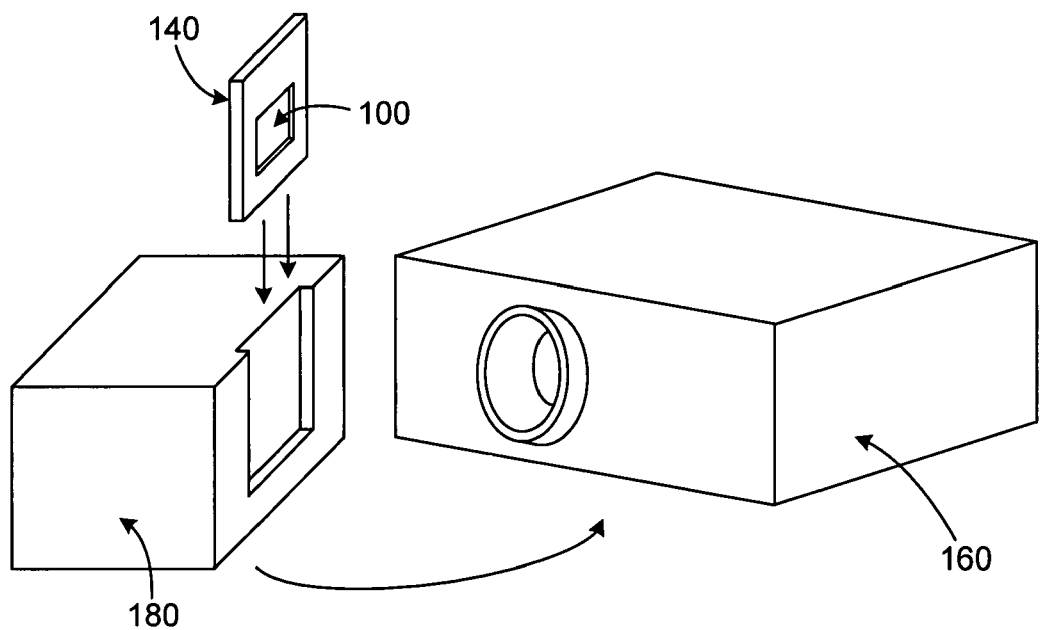
FIG. 9 is an elevated perspective view of a fluidics chamber employed in conjunction with a light-pipe array, a reaction chamber, and a UV light projector, in accordance with a preferred embodiment of the present invention.

During operation, the light-pipe array together with the reaction chamber are connected with a fluidics chamber 180 (FIG. 9). The fluidics chamber 180 preferably houses the various chemical reagent reservoirs, the fluidic control electronics, and the fluidic delivery system to deliver the various oligonucleotide-forming fluids and washing fluids mentioned above. The projected UV light from the UV light projector 160 is projected towards the light-pipes while the light-pipe array combined with the reaction chamber, are connected with the fluidics chamber. FIG. 9 is an elevated perspective view of a fluidics chamber employed in conjunction with a light-pipe array, a reaction chamber, and a UV light projector, in accordance with a preferred embodiment of the present invention. The DMD, projected UV light, and the UV light-receiving element are employed in synchrony to guide light through the light-pipes for direct oligonucleotide synthesis in situ substantially targeted at the light-pipe exit. A high density array of thousands of light-pipes are integrated with (e.g. microfluidic) channels within the fluidics chamber to ensure an extremely precise and accurate distribution of (e.g. microliters of) biological samples and chemical reagents during oligonucleotide probe synthesis and genomic analysis. On-location optical energy delivery in this enclosed microfluidic system guarantees high quality oligonucleotide probes and sterility, even in the field of operation.

The light-pipes within the light-pipe array are preferably cylindrical having a circular cross-section. The dielectric may have a thickness of at least approximately 0.1 μm. The conductor 114 may be singular or may comprise multiple concentric cylinders. In either scenario, the conductor 114 preferably has an outer diameter in an approximate range of between 0.02 µm and 4.0 µm, and a length in an approximate range of between 2.0 µm-10.0 µm. The barrier layer 113 may have a thickness as small as about 0.2 µm. The optional substrate 111 may have any thickness sufficient to provide a substantially rigid mechanical support for the overlying light-pipe array.

Alternatively, the light-pipes may have non-circular shapes such as oval, triangular, square, etc. The conductor 114 may preferably have a corresponding shape. Moreover, the light-pipes may be tapered along the longitudinal direction. For example, they may be conical shaped with the entrance to the light-pipe being wider than the exit, or vice-versa, i.e. depending on the desired operation. The conductor 114 may preferably have a corresponding tapering. With the capability of highly dense distribution, the light-pipes within the light-pipe array may be positioned such that the distance from one light-pipe center to an adjacent light-pipe's center may be as small as 1.0 µm while having no upper limit restriction.

Figure 3:
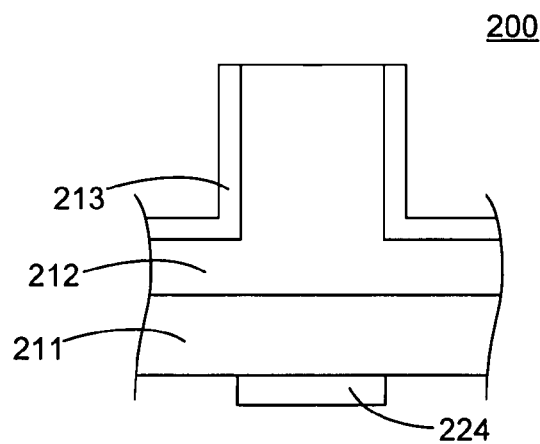
FIG. 3 is a cross-sectional side view of a light-pipe within a light-pipe array that includes a UV light-receiving element (e.g. in the form of a focusing element) formed exteriorly to a UV-transparent dielectric, in accordance with a preferred embodiment of the present invention.

In another preferred embodiment, the UV light-receiving element may alternatively be in the form of a focusing element 224 (shown in schematic-block form in FIG. 3). FIG. 3 is a cross-sectional side view of a light-pipe within a light-pipe array 200 that includes a UV light-receiving element (e.g. in the form of a focusing element 224) formed exteriorly to a UV-transparent dielectric 212 and the underlying substrate 211, in accordance with a preferred embodiment of the present invention. The focusing element 224 may comprise a focusing lens, diffractive focusing element, or a combination thereof. Each focusing element is positioned to be associated with a corresponding pixel while being positioned beyond the entrance of the dielectric 212 surrounded by the barrier layer 213 at a location that is not surrounded by the barrier layer. The focusing element is substantially adjacent to or in the vicinity of the entrance of the dielectric surrounded by the barrier layer. A center of the focusing element is preferably positioned along a central longitudinal axis of the dielectric. In another embodiment, the UV light-receiving element may alternatively comprise both the conductor 114 as described above in conjunction with FIG. 2, in combination with the focusing element 224 as described above in conjunction with FIG. 3.

Figure 4:
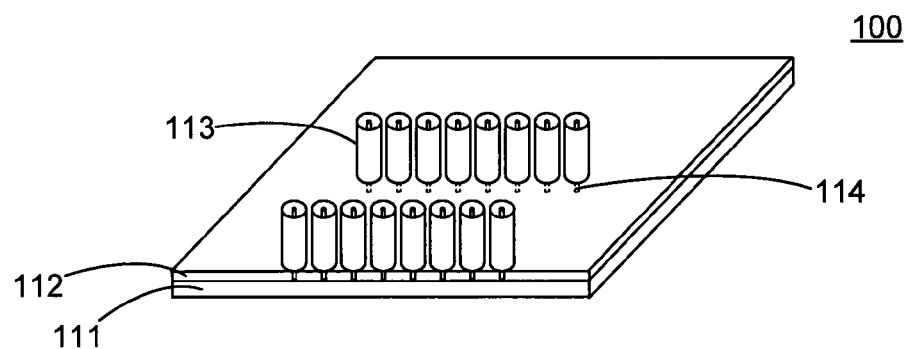
FIG. 4 is an elevated perspective view of a light-pipe array that includes two exemplary rows of light-pipes, in accordance with a preferred embodiment of the present invention.
Figure 5:
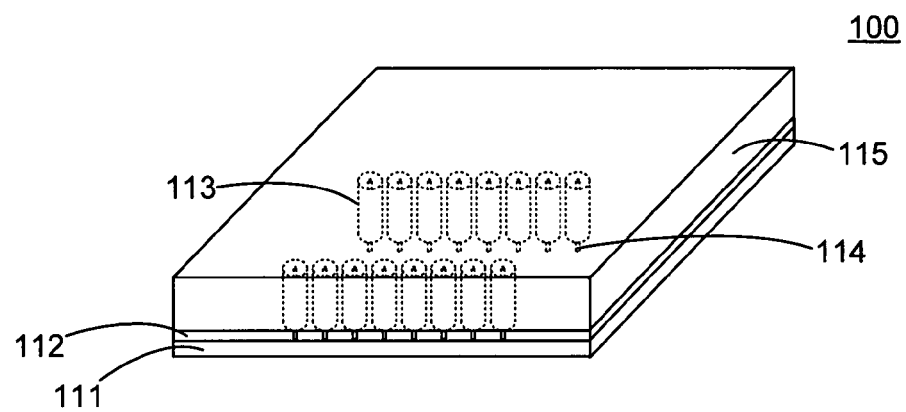
FIG. 5 is an elevated perspective view of a light-pipe array that includes two exemplary rows of light-pipes embedded within a glass layer, in accordance with a preferred embodiment of the present invention.

FIG. 3 also illustrates the optional omission of the glass layer 115 (i.e. from FIGS. 1 and 2). FIG. 4 is an elevated perspective view of a light-pipe array 100 that includes two exemplary rows of light-pipes (i.e. without glass layer 115), in accordance with a preferred embodiment of the present invention. FIG. 5 is an elevated perspective view of a light-pipe array that includes two exemplary rows of light-pipes embedded within the optional glass layer 115, in accordance with a preferred embodiment of the present invention.

Figure 10:
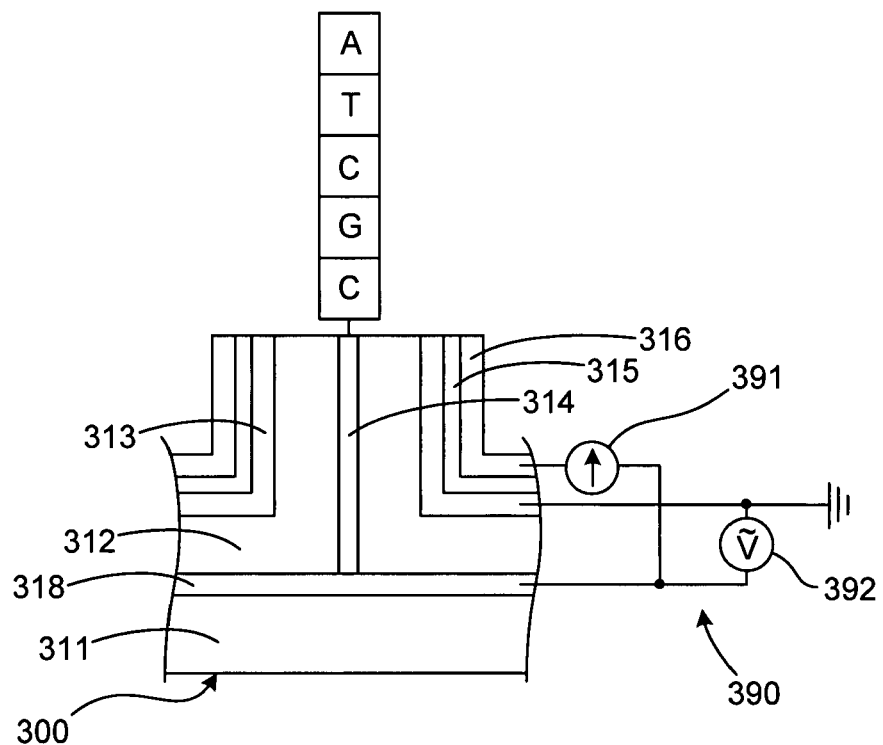
FIG. 10 is a cross-sectional side view of a light-pipe within a light-pipe array that includes a UV-transparent electrical conductor, and the formation of oligonucleotides, in accordance with a preferred embodiment of the present invention.

In another preferred embodiment, a non-optical detection scheme is provided. The non-optical detection scheme detects, for example, various levels of DNA hybridization completion that occurs during and/or subsequent the hybridization process. The scheme is capable of detecting any change in electrical property that occurs at the exit of each light-pipe. To accomplish this detection technique, a UV-transparent electrical conductor (e.g. conducting layer or conducting wire) 318 (such as, for example, indium tin oxide) is added to the embodiment illustrated in FIG. 2 (see exemplary light-pipe array 300 in FIG. 10). In particular, the electrical conductor 318 is positioned between the dielectric 312 (having the electrical conductor 314 therein) and the underlying substrate 311 as illustrated in FIG. 10. Additionally, an electrically sensing electrode 316 (preferably made of similar materials as the UV barrier layer 113) positioned on a side of the UV barrier layer 313 opposite the dielectric 312 is provided with an electrical insulator 315 (such as, for example, silicon dioxide) positioned between the UV barrier layer 313 and the sensing electrode 316. The deposition processes of the insulator 315 and sensing electrode 316 may be, for example, similar to those of the dielectric 112 and barrier layer 113, respectively, of FIGS. 1 and 2, while the deposition process of the UV-transparent electrical conductor 318 may be performed by CVD or sputter deposition, for example. An optional insulator (not shown) such as, for example, spin-on-glass or silicon dioxide may be formed on the sensing electrode 316.

The UV-transparent electrical conductor 318, the UV barrier layer 313, and the sensing conductor 316 are all preferably electrically connected to an electrical circuit 390 which is capable of detecting variations in electrical properties during and/or subsequent oligonucleotide hybridization therefore allowing for real-time monitoring. To accomplish this detection, the electrical circuit 390 comprises, for example, electrical signal generating circuit 391 and electrical signal detection unit 392 as illustrated in FIG. 10. By using this exemplary detection configuration, conventional optical scanning techniques which are inefficient and inaccurate are avoided. Additionally, the expensive, tedious and time-consuming task of fluorescent dye labeling is not required. In the configuration of FIG. 10, an optional layer (e.g. spin-on-glass) may be employed similar to the configuration of FIG. 2.

Fabricating low cost, high quality arrays with fast turn-around time as described above is a major step in the process of DNA analysis and detection. Conventionally, numerous benches of equipment and long, manual protocols are required for genomic analysis. With on-chip non-optical detection capability as illustrated in FIG. 10, the present invention can automatically monitor the hybridization in real-time for genomic analysis. This instant feedback and portability allows scientists and medical professionals immediate access to potential life-threatening information, e.g., at the port-of-entry during the foot-and-mouth epidemic in the UK, or during the SARS outbreak in Asia.

With a complementary suite of user-friendly software for array design and data analysis (i.e. along with electronic control and/or data acquisition), the above techniques will drastically reduce the cost and time for genomic analysis. Systems will be commonly purchased for routine clinical use. A new era of preventive medicine will be possible based upon individual gene profiling. This portable gene analysis system will enable scientists and medical professionals to make instantaneous, informed decisions.

Those of ordinary skill in the art will recognize that various modifications and variations may be made to the embodiments described above without departing from the spirit and scope of the present invention. For example, although the embodiments above describe aspects of the invention in conjunction with a light-pipe array generating DNA-type genomic probes, generation of other materials via the light-pipe array of the present invention such as, for example, proteins, peptides, chemicals, molecules, metals, or combinations thereof may also be contemplated. As another example, although the above embodiments are described using a light-pipe array employed in conjunction with a UV light projector that projects UV light, other types of excitation projection sources that project non-UV light may alternatively be employed and will fall within the scope of the present invention. In any of the above embodiments, the size/dimensions of the various elements comprising the light-pipe array may differ from those mentioned in the description above. These differences will still fall within the scope of the present invention. It is therefore to be understood that the present invention is not limited to the particular embodiments disclosed above, but it is intended to cover such modifications and variations as defined by the following claims.

What is claimed is:

1. A light-pipe array system, the system comprising:
a light projector that projects light; and
a light-pipe array, wherein the light-pipe array comprises a plurality of light-pipes, and wherein each light-pipe comprises:
  a dielectric transparent to the light;
  an electrically conductive light barrier layer surrounding the dielectric, wherein the barrier layer guides the light from an entrance of the dielectric surrounded by the barrier layer to an exit of the dielectric surrounded by the barrier layer; and
  a light-receiving element that increases throughput of the guided light transmitted within the barrier layer via the dielectric;
wherein the light-receiving element comprises an electrical conductor positioned along a central longitudinal axis of the dielectric, wherein the conductor includes a first end and a second end, wherein the first end extends beyond the entrance of the dielectric surrounded by the barrier layer to a location that is not surrounded by the barrier layer, and wherein the second end terminates substantially at the exit of the dielectric surrounded by the barrier layer.

2. The system of claim 1, wherein the light comprises UV light.

3. A light-pipe array system, the system comprising:
a light projector that projects light; and
a light-pipe array, wherein the light-pipe array comprises a plurality of light-pipes, and wherein each light-pipe comprises:
  a dielectric transparent to the light;
  an electrically conductive light barrier layer surrounding the dielectric, wherein the barrier layer guides the light from an entrance of the dielectric surrounded by the barrier layer to an exit of the dielectric surrounded by the barrier layer; and
  a light-receiving element that increases throughput of the guided light transmitted within the barrier layer via the dielectric;
wherein the light-receiving element comprises a focusing element positioned beyond the entrance of the dielectric surrounded by the barrier layer at a location that is not surrounded by the barrier layer.

4. The system of claim 3, wherein a center of the focusing element is positioned along a central longitudinal axis of the dielectric.

5. The system of claim 3, wherein the focusing element is substantially adjacent to or in the vicinity of the entrance of the dielectric surrounded by the bather layer.

6. The system of claim 3, wherein the focusing element comprises an item selected from the group consisting of focusing lens, diffractive focusing element, and combinations thereof.

7. The system of claim 1, wherein the barrier layer corresponding to one of the light-pipes within the light-pipe array is integral with or electrically connected to an electrically conductive light barrier layer corresponding to an adjacent one of the light-pipes within the light-pipe array.

8. The system of claim 1, wherein the barrier layer corresponding to one of the light-pipes within the light-pipe array is electrically isolated from an electrically conductive light barrier layer corresponding to an adjacent one of the light-pipes within the light-pipe array.

9. The system of claim 1, wherein each light-pipe further comprises a substrate transparent to the light, wherein the dielectric is positioned on the substrate.

10. The system of claim 9, wherein each light-pipe further comprises:
an electrical conductor transparent to the light, wherein the electrical conductor is positioned between the dielectric and the substrate;
an electrical insulator positioned on the barrier layer; and
an electrically sensing electrode positioned on a side of the barrier layer opposite the dielectric such that the insulator is position between the barrier layer and the sensing electrode;
wherein the electrical conductor, the barrier layer, and the sensing electrode are electrically connected to an electrical circuit.

11. The system of claim 10, wherein the electrical circuit detects variations in electrical properties during oligonucleotide hybridization.

12. The system of claim 10, wherein the electrical circuit detects variations in electrical properties subsequent oligonucleotide hybridization.

13. The system of claim 1, wherein the guided light transmitted within the barrier layer via the dielectric is used in fabricating sequences of nucleotides.

14. The system of claim 1, wherein the guided light transmitted within the barrier layer via the dielectric is used in fabricating sequences of nucleotides at or in the vicinity of the exit of the dielectric.

15. The system of claim 3, wherein the light comprises UV light.

16. The system of claim 3, wherein the guided light transmitted within the barrier layer via the dielectric is used in fabricating sequences of nucleotides.

17. The system of claim 3, wherein the guided light transmitted within the barrier layer via the dielectric is used in fabricating sequences of nucleotides at or in the vicinity of the exit of the dielectric.

* * * * *